(No Model.) 2 Sheets—Sheet 1.

L. STEVENSON.
ICE CREAM FREEZER.

No. 423,092. Patented Mar. 11, 1890.

Witnesses
Geo. W. Breck
Edward Thorpe

Inventor
Louise Stevenson
By her Attorney
Samuel G. Metcalf (No Model.) 2 Sheets—Sheet 2.

L. STEVENSON.
ICE CREAM FREEZER.

No. 423,092. Patented Mar. 11, 1890.

Witnesses
Geo. W. Breck.
Edward Thorpe.

Inventor
Louise Stevenson
By her Attorney
Samuel G. Metcalf.

UNITED STATES PATENT OFFICE.

LOUISE STEVENSON, OF MORRISTOWN, NEW JERSEY.

ICE-CREAM FREEZER.

SPECIFICATION forming part of Letters Patent No. 423,092, dated March 11, 1890.

Application filed November 29, 1889. Serial No. 331,979. (No model.)

*To all whom it may concern:*

Be it known that I, LOUISE STEVENSON, of the town of Morristown, in the county of Morris and State of New Jersey, have invented a certain new and useful Improvement in Ice-Cream Freezers, of which the following is a full, clear, and exact description, reference being had to the accompanying drawings, forming part of this specification.

My invention relates to freezers for freezing ice-cream, water-ices, and other substances.

The object thereof is to provide a freezer of the novel construction herein shown and described, in which cream or such other substances of two or more flavors may be frozen at one operation as readily and as satisfactorily as one flavor in the ordinary single freezer, and at the same time, by constructing the cream-cans so that they may be used independently, to permit the freezer to be used for freezing one kind of cream at a time without an undue expenditure of labor and material.

To this end my invention consists, generally, in a freezer having two or more cream-cans each provided with an independent agitator or stirrer, all mounted upon the same driving-shaft one above the other; and it consists, further, in the novel details of construction and in the arrangement and combination of parts hereinafter described and claimed.

Figure 1:
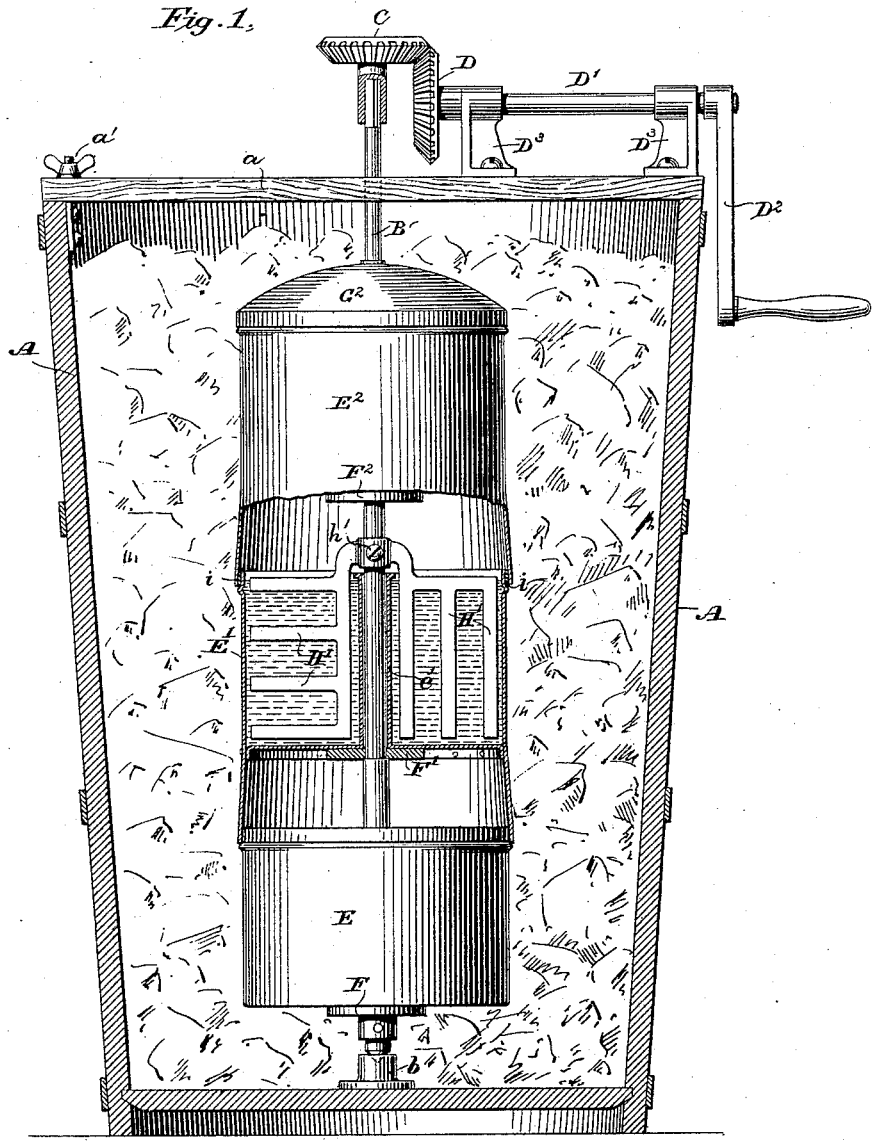
Figure 2:
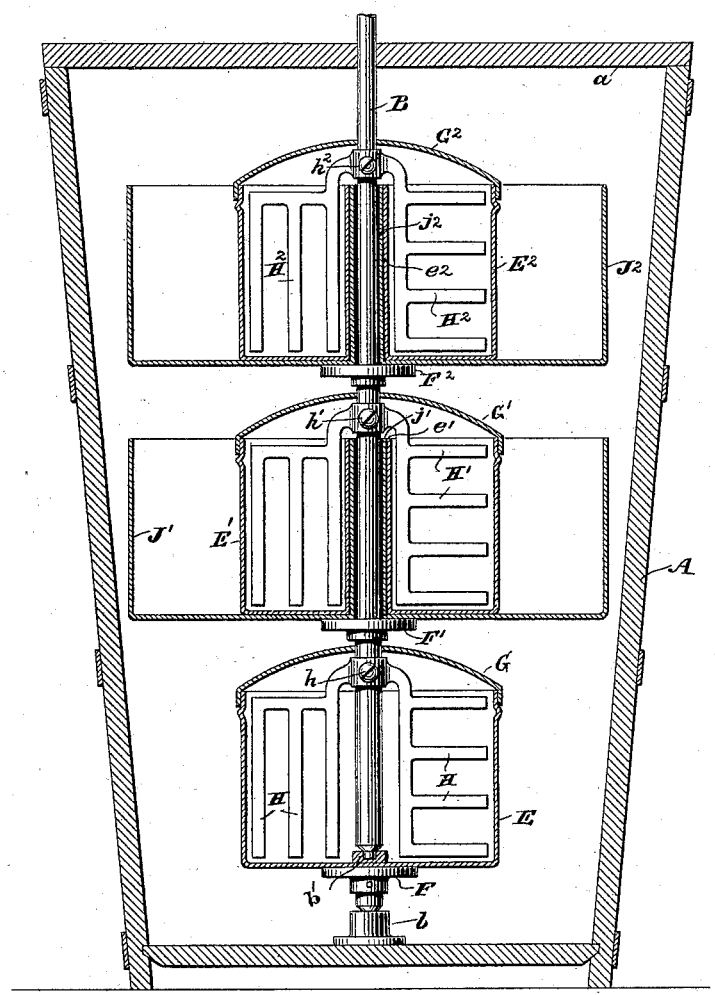

In the accompanying drawings, Figure 1 is a sectional elevation of my improved freezer; and Fig. 2 is also a sectional elevation thereof, showing a modified construction of the freezer.

Similar letters of reference are used to designate corresponding parts in all the views.

Referring to Fig. 1, within the tub or pail A is journaled the driving-shaft B, which is supported by a center piece $b'$, suitably secured within the lower cream-can E. The shaft B projects through the cross-piece $a$, which extends across the top of the tub and is removably held in position by any suitable catches, such as the thumb-screw $a'$. The shaft B is rotated by the gear-wheel C, mounted thereon, which meshes with the gear-wheel D, driven by shaft $D'$ and crank $D^2$, which are journaled in bearings $D^3$ $D^3$, secured to the cross-piece $a$. The gear-wheel C is provided with a depending socket, the bore of which is square, and the upper end of the shaft B, which fits into the socket, is also square, so that they will rotate together and still permit the wheel to be readily removed from the shaft.

The cream-can E is provided with a suitable bearing-plate F, and is supported by the center piece $b$, secured to the bottom of the tub, and the annular or ring-shaped cream-cans $E'$ $E^2$ are centrally mounted upon the shaft B and rest upon the washers $F'$ $F^2$, which are supported by steps or projections on the shaft. While affording the requisite support to the washers and cans, these steps permit them to be readily lifted off the shaft when desired. The central tube $e'$ $e^2$ of the cans $E'$ $E^2$ surrounds the shaft, and is of sufficient height to prevent the contents of the cans from spilling over.

In order to exclude the melted ice and salt from the two lower cans, the sides of the two upper cans $E'$ $E^2$ are, as shown in Fig. 1, carried down below the bottoms of the cans, and are slightly flared, so that the lower part of can $E'$ will fit tightly over can E, and the lower part of can $E^2$ will fit over can $E'$. A suitable packing-ring $i$ may be interposed between the cans, if desired. The upper can $E^2$ is provided with a cover $G^2$, which may also be used on either of the lower cans when only one or both of them are used.

Each can is provided with a stirrer H $H'$ $H^2$ for thoroughly agitating the contents thereof during the freezing process. The stirrers are firmly secured to the shaft by means of the set-screws $h$ $h'$ $h^2$, by loosening which the stirrers may be readily lifted off the shaft, although of course other means of securing the stirrers removably to the shaft may be employed, and the lower stirrer H may, if desired, be formed integrally with the shaft B.

If desired, instead of providing the cans $E'$ $E^2$ with extensions to fit over the can beneath, the modified construction may be adopted, which I have illustrated in Fig. 2, wherein independent cans $j'$ $j^2$ are provided to hold the freezing-mixture around the two upper cans. These ice-cans $J'$ $J^2$ should be of slightly less diameter than the tub, and should be provided with central tubes, $j'$ $j^2$, similar to the tube $e'$, surrounding the shaft B, between it and tube $e'$. The annular space between the sides of the cream-cans and these independent ice-cans would be filled with the freezing-mixture to the tops of the cream-cans. These ice-cans would only be required for the upper two cream-cans, and in case such a construction should be adopted ordinary covers G G' G² could be used for all the cream-cans, because the ice and salt when melted would not rise above the top of any can.

The operation of my improved freezer will now be readily understood. The mixture which it is desired to freeze, having been properly compounded and prepared, is poured into the cream-cans, one kind or flavor in each can. A quantity of ice and salt, if that be the freezing-mixture employed, is spread over the bottom of the tub, and the can E is placed in position within the tub and rests upon the center piece $b$. The shaft B is then put in place, and the stirrer belonging to can E is secured thereto within the can by its set-screw. The washer F' and can E' are then placed on the shaft, and can E' is fitted over can E. Ice and salt are then packed around the sides of the cans, and the upper can is fitted in place. When all the cans that are to be used are in position, the cross-piece $a$ is fitted over the shaft and properly secured, the gear-wheel C is adjusted upon the upper end of the driving-shaft, and the freezer is ready to operate. The ice and salt are packed around the cream-cans with sufficient solidity to prevent them from turning with the shaft. When the crank D² is turned, the requisite agitation of the contents of the cream-cans is produced, which is essential to the production of cream of satisfactory quality.

From the above description of the operation of the freezer, as illustrated in Fig. 1, the operation of the modification thereof (shown in Fig. 2) is so apparent as to require no special description.

The advantages which attend the use of my invention are numerous. Two or more kinds of cream may be made at a single operation, involving with the simple and effective apparatus which I have described but little or no more time and labor than are required to produce one kind in the ordinary single freezer. Furthermore, with my improved freezer the repacking of the frozen cream is avoided, because the same may be packed away directly in the cans in which it is frozen. If, however, it is desired to transfer the cream into molds, the operation can be performed with great facility, because the contents of the cans are easily accessible and are all in the same condition, all having been frozen at the same time.

Another advantage achieved by my invention, and one which renders it especially desirable for family use, is that any one or two of the cans may be used alone, thus permitting a very small quantity of cream to be readily and conveniently made.

It is to be understood that I do not limit the use of my invention to the manufacture of ice-cream only, as it may be used advantageously for freezing many other substances. More than three cans may also be used, if desired.

Having thus described my invention, what I claim as new, and desire to secure by Letters Patent, is—

1. In a freezer, the combination of a plurality of cream-cans mounted one above the other on the same driving-shaft, of a corresponding number of independent stirrers mounted on said shaft so as to rotate one within each can, and of mechanism, substantially as described, for rotating said stirrers, substantially as and for the purposes set forth.

2. A freezer, substantially as described, provided with a plurality of independent cream-cans mounted one above the other on the same shaft, the cover of one can being formed by an extension of the can next above it, substantially as and for the purposes set forth.

LOUISE STEVENSON.

Witnesses:
  LINA DARRELL,
  EDNA B. MOSS.